United States Patent [19]

Sakurai

[11] Patent Number: 4,523,138
[45] Date of Patent: Jun. 11, 1985

[54] DRIVE CONTROL METHOD FOR STEPPING MOTORS

[75] Inventor: Shigeo Sakurai, Chigasaki, Japan

[73] Assignee: Mikuni Kogyo Kabushiki Kaisha, Tokyo, Japan

[21] Appl. No.: 557,547

[22] Filed: Dec. 2, 1983

[30] Foreign Application Priority Data

Dec. 3, 1982 [JP] Japan .................... 57-211368
Aug. 17, 1983 [JP] Japan .................... 58-150078

[51] Int. Cl.$^3$ .............................. H02K 29/04
[52] U.S. Cl. ........................ 318/685; 318/696
[58] Field of Search ............ 318/696, 685; 123/585

[56] References Cited

U.S. PATENT DOCUMENTS 4,137,491 1/1979 Bartley et al. ............... 318/685

*Primary Examiner*—Vit W. Miska
*Assistant Examiner*—Saul M. Bergmann
*Attorney, Agent, or Firm*—Cushman, Darby & Cushman

[57] ABSTRACT

A drive control method for stepping motors as used in connection with controlling throttle valves for internal combustion engines. A computer controls actuation of the throttle valve in accordance with engine operating conditions and the like, as well as the amount of fuel being injected to the engine. The method includes steps for increasing the response speed of the stepping motor without detracting from its resolution. Instead of predetermined rotation angles, the stepping motor repeatedly actuates in a time period which is determined as the sum of its stationary time after one rotation step, and its stationary time after the following one rotation step. This enables obtaining substantially smaller and hence faster angular displacements of the stepping motor than use of predetermined unit rotation angles.

3 Claims, 6 Drawing Figures

DRIVE CONTROL METHOD FOR STEPPING MOTORS

BACKGROUND OF THE INVENTION (a) Field of the Invention

The present invention relates to a drive control method for stepping motors.

(b) Description of the Prior Art

Conventionally, for example, in a fuel supply device for internal combustion engines in which the air amount to be supplied to the engine is adapted to be controlled by a throttle actuator comprising a stepping motor, the opening angle $\theta$ of the throttle valve is stepwisely determined in correspondence to each unit step S of the stepping motor. Referring to FIG. 1, it shall be explained briefly in the following. In case an opening angle $\theta_F$ of the throttle valve to give a desired air amount $QA_F$ is between the opening angle $\theta_1$ at the first step $S_1$ of the stepping motor and the opening angle $\eta_2$ at the second step $S_2$ to follow the first step $S_1$, this air amount $QA_F$ is substituted by either one of the air amount $QA_1$ of the opening angle $\theta_1$ and the air amount $QA_2$ by the opening angle $\theta_2$. Therefore, this kind of the device has such a defect as not able to realize the above mentioned proper opening angle by being regulated by the stepwise action of the stepping motor or by the step even when a proper opening angle is obtained with high accuracy basing upon various driving data. Therefore, such a method as to use a micro step is thought of, but it is not apt for practical uses due to the inaccuracy of the action thereof.

SUMMARY OF THE INVENTION

The primary object of the present invention is, in view of the above circumstances, to provide a drive control method for stepping motors enabled to obtain substantially an intermediate rotation position between the unit steps.

This object is attained, according to the present invention, by providing a first step for stopping a rotor by a dwell time length $t_1$ at a first angular position rotated one step, a second step for stopping the rotor by a dwell time length $t_2$ same as or different from the time length $t_1$ at a second angular position rotated at least one step from the first angular position and a third step for actuating the rotor repeatedly in a period consisting of the combination of the first and second steps.

This and other objects of the present invention will become more apparent during the course of the following detailed description and appended claims.

DESCRIPTION OF THE PREFERRED EMBODIMENT

Figure 2:
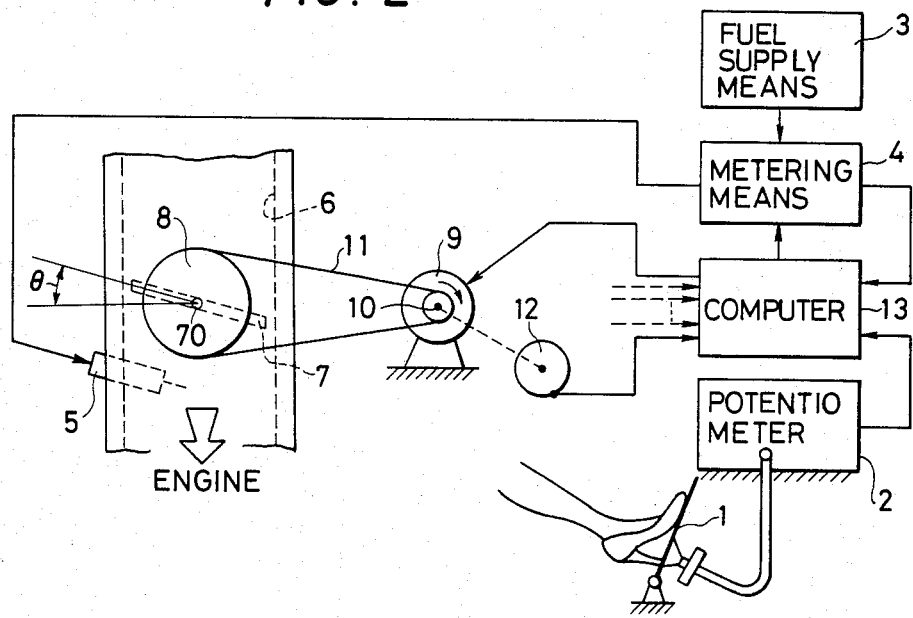
FIG. 2 is a view showing the relation between the throttle valve opening angle and the air amount to be controlled by the stepping motor.

First, referring to FIG. 2, an example of a fuel supply device for internal combustion engines in which the throttle valve is actuated by a stepping motor is explained. In FIG. 2 there is illustrated an accelerator pedal 1 and a potentiometer 2 for converting the displacement of accelerator pedal 1 into an electric signal. A fuel supply means 3 is provided along with a metering means 4 for metering the fuel to be supplied from fuel supply means 3. Reference numeral 5 refers to an injector connected to the metering means 4 and arranged in an intake manifold bore 6. A throttle valve 7 is provided to control the amount of air supplied to the engine. The throttle valve has a driving shaft 70 which extends outside of the intake manifold bore 6 and has a pulley 8 affixed thereto. A stepping motor 9 is mounted in an appropriate location near the intake manifold bore 6, with a pulley 10 being fixed to the rotor shaft of stepping motor 9. A belt 11 is mounted on and extends between the pulleys 8 and 10. A potentiometer 12 is provided to convert the amount of rotation of the stepping motor 9 or the opening angle of throttle valve 7 into an electric signal.

A computer 13 is provided which includes a microprocessor, an input/output interface and a memory. The computer receives output signals from potentiometers 2 and 12, metering means 4 and other various sensors (not shown) for detecting engine operating state as well as environmental conditions and the like. The computer outputs command signals to the metering means 4 to secure a fuel injection amount selected by displacement of accelerator pedal 1. The computer controls the throttle valve opening angle and number of idling revolutions responsive to the fuel injection amount to optimum values in conformity with the operating state of the engine.

Next, the operation of the above mentioned device shall be explained.

When the driver steps on the accelerator pedal 1, a signal put out from the potentiometer 2 in accordance with the stepped-on amount is put in the computer 13. The computer 13 decides the fuel amount to be flowed out from the injector 5 in accordance with the operating state of the engine at that moment and the thus decided amount of the fuel is injected into the intake manifold bore 6 through the injector 5. On the other hand, the computer 13 calculates the optimum air amount at that moment basing upon the inputs from the above mentioned respective sensors, puts out the result to the stepping motor 9 in the form of a pulse signal and brings the throttle valve 7 into the opening angle position able to obtain the optimum air amount through the pulleys 8, 10 and the belt 11. In this mode, as the computer 13 keeps on always calculating the optimum air supply amount at each moment, it results in always supplying a proper air-fuel mixture to the engine during the operation.

Figure 1:
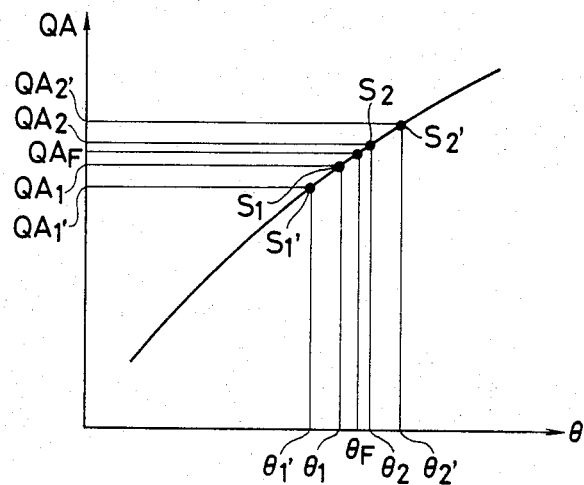
FIG. 1 is an explanatory diagram showing an example of the fuel supply device for internal combustion engines provided with the stepping motor to be driven by the method according to the present invention.
Figure 3:
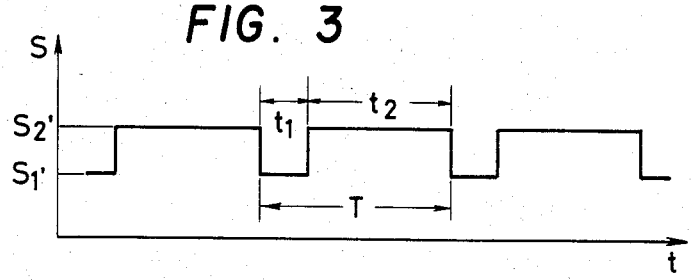
FIG. 3 is a diagram showing an embodiment of the control method for the stepping motor according to the present invention.
Figure 4:
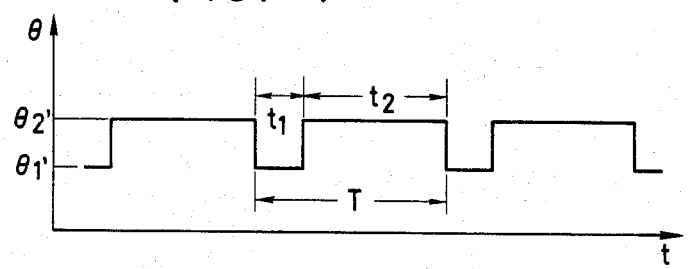
FIG. 4 and FIG. 5 are diagrams showing the change of the throttle valve opening angle and air amount to be controlled by the stepping motor which is actuated by the method shown in FIG. 3.
Figure 5:
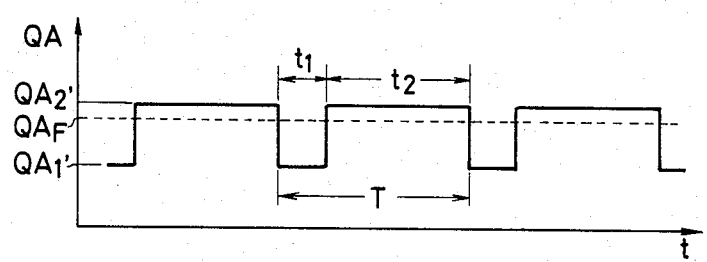

By the way, during the above mentioned control, the stepping motor 9, for example, as shown in FIG. 3, is controlled so as to repeat the action of such period $T(=t_1+t_2)$ as to make the rotor stop and dwell during the time length $t_1$ in the angular position obtainable at the step $S_1$ or at the first step $S_{1'}$ before the step $S_1$ by at least one step (in FIG. 1 one step before the step $S_1$) and next during the time length $t_2$ in the angular position obtainable at the step $S_2$ or at the second step $S_{2'}$ after the step $S_2$ by at least one step and after the first step $S_{1'}$ by a plurality of steps (in FIG. 1 one step after the step $S_2$). Here, T is, for example, 16 ms and, as the throttle valve opening angle $\theta$ as well as the air amount QA may be thought to linearly change in the micro section between the respective angular positions obtained at the steps $S_{1'}$ and $S_2$, the $t_2$ is given by $$t_2 = T \times \frac{\theta_F - \theta_{1'}}{\theta_{2'} - \theta_{1'}} = T \times \frac{QA_F - QA_{1'}}{QA_{2'} - QA_{1'}} \quad (1)$$

where $\theta_{1'}$ and $\theta_{2'}$ represent the throttle valve opening angles at the steps $S_{1'}$ and $S_{2'}$, and $QA_{1'}$ and $QA_{2'}$ represent the air amounts at the opening angles $\theta_{1'}$ and $\theta_{2'}$. When the stepping motor 9 is actuated with the period T repeatedly during a sufficient long time compared with said period T, the throttle valve 7 will be made to swing with the period T between the opening angles $\theta_{1'}$ and $\theta_{2'}$ as shown in FIG. 4. Accordingly, the air amount QA to be supplied to the engine periodically changes to $QA_{1'}$ during the time length $t_1$ and next to $QA_{2'}$ during the time length $t_2$ as shown in FIG. 5. Accordingly, the average value $\overline{QA}$ of the air amount QA to be supplied to the engine during the one period T is given by $$\overline{QA} = \frac{QA_{1'} \times t_1 + QA_{2'} \times t_2}{T} \quad (2)$$

and, as the ratio of the dwell time of $t_1$ to the dwell time of 2 is so selected that the $\overline{QA}$ is to be equal to a desired air amount $QA_F$, the desired air amount $QA_F$ is obtainable. In this case, as the stepping motor 9 is so controlled as to act by a plurality of steps, the action thereof is accurate.

Figure 6:
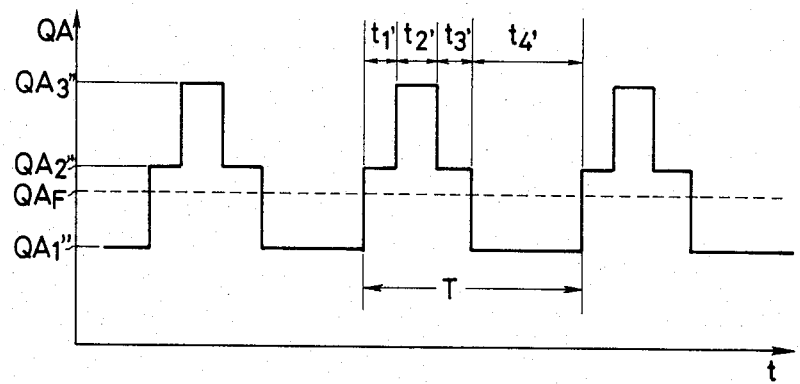
FIG. 6 is a diagram showing the change of the air amount to be controlled by the stepping motor which is actuated by another embodiment of the method according to the present invention.

In the above description, the time length necessary in order that the rotor of the stepping motor 9 moves by on unit step is neglected since it is very short. However, in case the difference between the angular position to be obtained at the first step $S_{1'}$ and the angular position to be obtained at the second step $S_{2'}$ is comparatively large, it is not preferable to neglect the above mentioned time length. FIG. 6 shows an example of the change of the air amount to be controlled by the stepping motor 9 in case the time length necessary in order that the rotor of the stepping motor moves by on unit step is taken into account. According to this embodiment, as is apparent from the description relevant to FIG. 5, the average value $\overline{QA}$ of the air amount QA to be supplied to the engine during the one period T is given by $$\overline{QA} = \frac{QA_{1''} \times t_{4'} + QA_{2''} \times (t_{1'} + t_{3'}) + QA_{3''} \times t_{2'}}{T} \quad (3)$$

Here, $T = t_{1'} + t_{2'} + t_{3'} + t_{4'}$. The formula (3) indicates that, when the time length necessary in order that the rotor of the stepping motor 9 moves by one unit step is taken into account, the desired air amount $QA_F$ is able to be controlled with more accuracy.

As described above, as the present invention is so formed that the stepping motor 9 is stopped at the first step and at the second step advanced by a plurality of steps from said first step and that the intermediate position of the unit step is substantially attained as an average value in a time scale at between the dwell time at the first step and the dwell time at the second step by properly selecting the ratio of stationary time lengths at the first step and the second step, more minute control beyond the space between the steps or the mechanical resolving ability of the stepping motor is able to be accurately effected and it has such an effect as to be able to elevate the acting speed of the stepping motor without introducing the deterioration of the resolving ability.

By the way, when the difference between the first step and the second step is made large, a pulsation occurs in the air amount to be introduced into the internal combustion engine. Therefore, the method according to the present invention is able to be utilized for other purposes which are required of the pulsation. The above explanation is made on the case in which the throttle valve is driven by the stepping motor. However, it is needless to say that the present invention, without limiting to this, may be adapted to the stepping motor used in various purposes.

I claim:

1. A drive control method for stepping motors for obtaining substantially smaller angular displacement of the rotor than a predetermined unit rotation angle comprising a first step of stopping the rotor of the stepping motor for a first dwell time length at a first angular position rotated by one step from a starting position, a second step of stopping said rotor for a second dwell time length at a second angular position rotated by at least a unit step of the stepping motor from said first angular position, and a third step of repeatedly actuating said rotor making the combination of the dwell times of said first and second steps one period, a predetermined equivalent intermediate angular position between said first and second angular positions being obtained substantially in time average by selecting the ratio of said first dwell time length to said second dwell time length to be a predetermined value.

2. A drive control method for stepping motors according to claim 1 wherein said second time length is the same as said first time length.

3. A drive control method for stepping motors according to claim 1 wherein said second time length is different from said first time length.

* * * * *